United States Patent [19]
Aycock et al.

[11] Patent Number: 5,156,920
[45] Date of Patent: Oct. 20, 1992

[54] POLYPHENYLENE ETHER RESIN COMPOSITIONS HAVING IMPROVED ADHESION FOR DECORATIVE AND PROTECTIVE COATINGS

[75] Inventors: David F. Aycock, Glenmont, N.Y.; Peter H. Shu, Pittsburgh, Pa.

[73] Assignee: General Electric Company, Selkirk, N.Y.

[21] Appl. No.: 904,171

[22] Filed: Sep. 5, 1986

[51] Int. Cl.$^5$ ............................................. B32B 27/08
[52] U.S. Cl. .................................. 428/517; 264/129; 428/521; 427/393.5
[58] Field of Search ..................... 427/393.5; 525/68; 264/129; 428/517

[56] References Cited

U.S. PATENT DOCUMENTS

| | | | |
|---|---|---|---|
| 4,136,219 | 1/1979 | Odam et al. | 427/385.5 |
| 4,293,660 | 10/1980 | Sugio et al. | 525/68 |
| 4,360,618 | 11/1982 | Trementozzi | 529/141 |
| 4,433,088 | 2/1984 | Haaf et al. | 207/103 |
| 4,439,589 | 3/1984 | Alberts et al. | 524/152 |
| 4,440,906 | 4/1984 | Brandstetter et al. | 524/132 |
| 4,448,931 | 5/1984 | Sugio et al. | 525/68 |
| 4,513,120 | 4/1985 | Bennett, Jr. et al. | 525/68 |
| 4,543,391 | 9/1985 | Kuribayashi et al. | 525/68 |
| 4,578,423 | 3/1986 | Deets et al. | 525/68 |

FOREIGN PATENT DOCUMENTS

| | | |
|---|---|---|
| 0130839 | 1/1985 | European Pat. Off. . |
| 0137545 | 4/1985 | European Pat. Off. . |
| 0150021 | 7/1985 | European Pat. Off. . |
| 2375295 | 7/1978 | France . |
| 59-204650 | 11/1984 | Japan . |

*Primary Examiner*—Thurman K. Page
*Assistant Examiner*—Leon R. Horne
*Attorney, Agent, or Firm*—Hedman, Gibson & Costigan

[57] ABSTRACT

The adherence of protective and/or decorative paints to polyphenylene ether resins, alone, or combined with high impact strength polystyrene resins, is markedly improved by adding a high impact rubber modified terpolymer resin comprising units of a non-polar aromatic monovinyl compound, e.g., styrene, a polar monovinyl compound, e.g., acrylonitrile, acrylic acid, methacrylic acid, maleic anhydride, etc., and a diene rubber, e.g., butadiene.

20 Claims, No Drawings

POLYPHENYLENE ETHER RESIN COMPOSITIONS HAVING IMPROVED ADHESION FOR DECORATIVE AND PROTECTIVE COATINGS

FIELD OF THE INVENTION

The present invention relates to a method of improving the adhesion characteristics of thermoplastic compositions comprising a polyphenylene ether resin, alone, or in further combination with a styrene resin. Improved adhesion is brought about by incorporating a terpolymer comprising units derived from a non-polar aromatic monovinyl compound, a polar monovinyl compound and a diene rubber. As a result of the present invention, the polyphenylene ether resin compositions exhibit improved paint adhesion over known such compositions.

BACKGROUND OF THE INVENTION

It is known that polyphenylene ether resins, including those combined with high impact polystyrene, with or without flame retardant agents are very valuable as engineering thermoplastics. Articles molded therefrom have found widespread use in consumer and military components, in the automotive, business machine, home appliance and similar areas. One drawback in some compositions is that they exhibit somewhat less than optimum adhesion and are therefore not easy to paint As a result, articles molded from polyphenylene ether resin compositions have not been entirely satisfactory where color, pattern, appearance and environmental resistance are important. Further, less than adequate adhesion to paints has made it difficult to employ these compositions in applications where coatings are applied to produce EMI shielding, anti-static properties and electrical conductivity, although it has been proposed, for example, in Haaf et al., U.S. Pat. No. 4,433,088, to use small amounts of polyolefin glycols and low molecular weight polyamides to improve paint adhesion. The latter compositions do have drawbacks, however, because such additives can lower physical properties and the compositions must be kept free of polyethylene, which is normally desirable for surface appearance and mold release purposes.

It is also known, for example, from Trementozzi, U.S. Pat. No. 4,360,618 to blend polyphenylene ether resins with styrene-acrylonitrile (SAN) or acrylonitrile-butadiene-styrene (ABS) polymers containing from 2 to 8% by weight of acrylonitrile and to obtain highly advantageous compositions in terms of molded article strength and distortion temperature. In Deets et al., U.S. Pat. No. 4,578,423, such compositions are described in which the polymers contain 8 to 17% by weight of acrylonitrile. However, there is no hint or suggestion in either patent that such polymer compositions would have improved or even adequate adhesion to paints.

It is therefore an object of the present invention to provide a method of improving the adhesion to paint of a thermoplastic composition containing a polyphenylene ether (PPO) resin and high impact polystyrene (HIPS) resin and, optionally, a flame retardant agent while retaining the properties typically associated with PPO-HIPS compositions such as high tensile strength and flexural strength.

It is a further object of the invention to provide a method of improving the adhesion of a thermoplastic composition so that the composition in the form of a molded article will retain a coating of paint even under adverse conditions, especially after soaking in water.

It is a still further object of the invention to provide a method of unexpectedly improving the flow properties of such thermoplastic compositions.

SUMMARY OF THE INVENTION

According to the present invention, there is provided a method for the production of a decoratively-coated or a protectively-coated molded article, said method comprising:

(i) adding an effective paint adhesion-promoting amount of a high impact rubber modified terpolymer resin comprising units of a non-polar aromatic monovinyl compound, a polar monovinyl compound and a diene rubber to a normally paint adhesion-resistant thermoplastic polyphenylene ether resin, alone, or in further combination with a styrene resin to obtain a moldable blended composition;

(ii) converting the moldable composition to a molded article; and (iii) thereafter applying to said molded article a coating comprising a decorative paint or a protective paint having improved adhesion.

In preferred features, the polyphenylene ether resin will comprise poly(2,6-dimethyl-1,4-phenylene ether)resin or poly(2,6-dimethyl-co-2,3,6-trimethyl-1,4-phenylene ether) resin. The adhesion-promoting terpolymer will preferably comprise polar monovinyl units derived from acrylonitrile, acrylic acid, methacrylic acid, maleic anhydride, vinyl pyridine, methyl methacrylate, vinyl acetate, glycidyl methacrylate, alpha-hydroxyethyl methacrylate or a mixture of any of them, preferably styrene will be the non-polar aromatic monovinyl compound, and butadiene will be the diene rubber component.

Other preferred features comprise forming the compositions by melt blending or by solution blending; and rendering them flame retardant and of improved impact resistance.

Also contemplated by the invention are articles having a firmly adherent decorative coating and/or a firmly adherent protective coating produced by the method of the invention. Firm adhesion is desired because it allows a wider selection of paint systems, easier applications and high quality finishes. Standard tests are employed to measure adhesion. One convenient test is the Method B-Cross-Cut Tape Test of American Society of Testing Materials Standard Test D-3359-76. The top rating of 5 is readily achieved in accordance with the present invention. Control substrate adhesion ratings rarely exceed 0.

DETAILED DESCRIPTION OF THE INVENTION

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of aryleneoxy structural units. The present invention includes all such variations and modifications, including but not limited to those described hereinafter.

The polyphenylene ethers favored for use in the practice of this invention generally contain structural units of the following formula

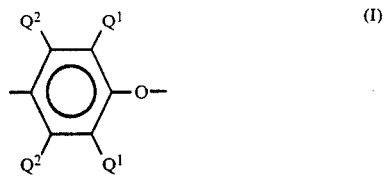

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalky, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.5 deciliters per gram (dl./g.), as measured in solution in chloroform at 25° C.

The polyphenylene· ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q_1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, α-hydroxyoximes (both monomeric and polymeric), o-hydroxyaryl oximes, and β-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

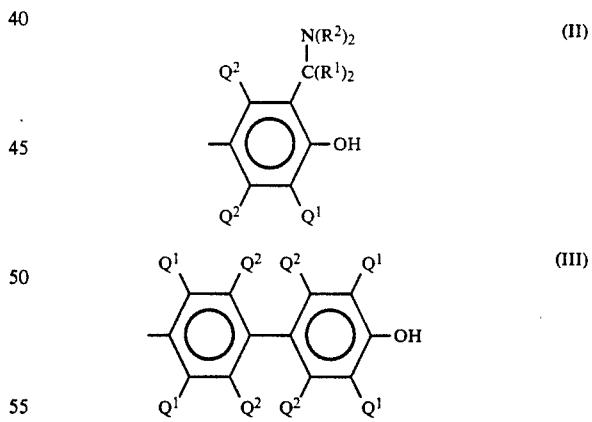

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

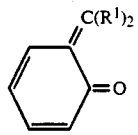
(IV)

Polymers with biphenol and groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

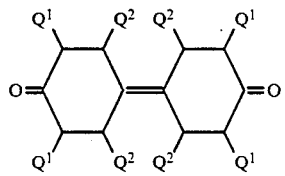
(V)

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

In those embodiments of the invention wherein the polyphenylene ether resin is used in further combination with a styrene resin, any of the styrene resins known for this purpose in the art, e.g., as described in Cizek, U.S. Pat. No. 3,383,435, can be used. Preferably, however the styrene resin will be a rubber modified, high impact polystyrene which is substantially free of polar monovinyl monomer units (as will be defined later with respect to the paint adhesion-promoting terpolymer).

If such is used, the rubber modified, high impact polystyrene can be selected from any of the materials known generally in the art as high impact polystyrenes, or HIPS. In general, these modified polystyrene resins are made by adding rubber during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPDM) rubbers, styrene-butadiene copolymers (SBR), and polyacrylates. The amount of rubber employed will vary, depending on such factors as the process of manufacture and individual requirements.

Included within this family of materials for purposes of the present invention are more recently developed forms in which such factors as the rubber particle size, the gel and cis contents of the rubber phase, and the rubber volume percent are regulated or controlled to achieve improvements in the impact resistance and other properties. These kinds of HIPS are described in the patent literature, including U.S. Pat. No. 4,128,602 (Abolins, Katchman and Lee, Jr.), and U.S. Pat. No. 4,528,327 (Cooper and Katchman), which are incorporated herein by reference.

Also contemplated as suitable for use are high impact polystyrenes having morphological forms which are sometimes referred to as core-shell, comprising particles of rubber encapsulated polystyrene dispersed in a matrix of polystyrene resin. Examples of this type are disclosed in U.S. Pat. No. 4,513,120 (Bennett, Jr. and Lee, Jr.), incorporated herein by reference, as well as the above-mentioned U.S. Pat. No. 4,528,327.

The terpolymer component employed to impart adhesion resistance in accordance with this invention is made, in general, following the teachings outlined above for high impact polystyrene, except that a polymerizable polar aromatic monovinyl compound is included in the reaction mixture or is copolymerized before blending with the other components. Also relevant to show making terpolymers is the disclosure in the above-mentioned Trementozzi and Deets et al. patents. In addition, detailed descriptive procedures for making suitable terpolymers will be provided hereinafter.

The terpolymers are produced by blending a rubber with the polar and non-polar monomers and these are then polymerized in the presence of a polybutadiene rubber. The non-polar aromatic vinyl monomers will be of the formula:

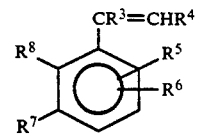

wherein $R^3$ and $R^4$ are selected from hydrogen or lower aklyl groups of from 1 to 6 carbon atoms; $R^5$ and $R^6$ are selected from chloro, bromo, hydrogen and lower alkyl groups of from 1 to 6 carbon atoms; and $R^7$ and $R^8$ are selected from lower alkyl groups having from 1 to 6 carbon atoms, hydrogen and halogen $R^5$ and $R^6$ may be concatenated together with hydrocarbyl groups to form a napthyl group.

Specific examples of non-polar aromatic vinyl compounds include styrene, bromostyrene, chlorostyrene and alpha-methyl styrene.

The terpolymer is made by including at least one polar vinyl monomer in the mixture of aromatic vinyl compound, preferably styrene, and diene rubber.

The polar monovinyl compounds which may be employed in the adhesion-promoting terpolymer generally have carbon-oxygen or carbon-nitrogen double-bonded or triple-bonded functional groups, as the case may be. Examples of such polar vinyl monomers include acrylic acid, methacrylic acid, substituted and unsubstituted alkyl and aryl acrylates and methacrylates wherein the alkyl group has from 1 to 6 carbon atoms, substituted and unsubstituted maleic anhydride wherein the substituents are selected from an alkyl group having 1 to 6 carbon atoms and an aryl group. Typical of the polar vinyl monomers which may be used to prepare the terpolymers are acrylonitrile, acrylic acid, maleic anhydride, vinyl pyridine, methyl methacrylate, vinyl acetate, glycidyl methacrylate and alpha-hydroxymethlacrylate. Acrylonitrile is especially preferred as the polar monomer because it has the additional advantage of improving the flow properties of the polyphenylene ether-high impact polystyrene composition.

The polar vinyl monomer is present in the terpolymer in an amount of from about 1 to 10 percent by weight, preferably from about 3 to 8 percent by weight, based on the overall weight of the terpolymer. The amount of the polyphenylene ether resin in the composition of the present invention is from about 20 to 80 percent by weight, preferably from about 40 to 60 percent by weight and the weight of the terpolymer is from about 80 to 20 percent by weight, preferably 60 to 40 percent by weight based on the overall weight of the composition.

The present kinds of compositions can also be formulated to include other ingredients in addition to those just described. These may be selected from among conventional materials commonly employed in polyphenylene ether resin blends, some of which are non-polymeric, others of which can be polymeric. Examples are plasticizers, mold release agents, melt viscosity reducers, colorants, stabilizers, antioxidants, mineral fillers (for example, clay), glass reinforcements, titanium oxides, lubricants, and so forth. Conventional amounts varying, for example, from less than 1 to greater than 50 percent by weight, per 100 percent by weight of the total composition, may be utilized.

The compositions can also be modified to include impact strength improving amounts of polymeric impact improvers, such as rubbery styrenic block copolymers, for example, di- or triblock copolymers of styrene and butadiene or the hydrogenated derivatives, i.e., styrene and ethylene/butylene.

The compositions can be prepared by any convenient method and, preferably, by forming a preblend of the ingredients, compounding the preblend by passing it through an extruder, and cooling the extrudate and cutting it into pellets or tablets. The tabletted composition can later be formed into the desired article, as by molding at elevated temperatures.

Because of their thermoplastic nature, the present compositions are particularly suitable for injection molding processes. Using standard procedures and conditions, these blends can be molded to various shapes and sizes, and the resulting products, besides having good flame retardancy, are characterized by excellent resistance to migration and blooming, good heat resistance, and good toxicological properties.

The following procedures can be used to obtain terpolymers useful as adhesion promoters in accordance with this invention.

PROCEDURE A

Preparation of A Terpolymer Comprising 5.1% Acrylonitrile, Styrene and Butadiene (for Examples 1 and 7)

A rubber modified terpolymer was prepared by thermally polymerizing a mixture of 75% styrene, 12.5% toluene, 3.5% acrylonitrile, 7.5% polybutadiene (Taktene 1202, Polysar Inc.), 1.4% mineral oil, and 0.07% of antioxidant (Irganox 1076 Ciba Geigy). The polymerization was carried out by pumping the feed mixture at a rate of 13.6 ml/min. to a reactor train consisting of 3 agitated reactors in series. Each reactor contained three temperature controlled zones with 0.68 liter/zone volume. The temperature of the reactor zones were in order (degrees centigrade): 114, 123, 125, 136, 140, 147, 141, 146, 164. The product from the last reactor was sent to a devolatilizing extruder where unreacted monomer and toluene were removed and the product was extruded and pelletized. The pellets were found to contain 5.1% copolymerized acrylonitrile.

PROCEDURE B

Preparation of a Terpolymer Comprising Styrene, acrylonitrile, and Butadiene (for Examples 2 and 9)

A rubber modified terpolymer was prepared by thermally polymerizing a mixture of 79% styrene, 10% toluene, 5% acrylonitrile, 5% polybutadiene (Taktene 1202, Polysar Inc.), 0.98% mineral oil, and 0.02% Irganox 1076 (Ciba Geigy). The polymerization was carried out by pumping the feed mixture at a rate of 17 ml/min. to a reactor train consisting of 3 agitated reactors in series. Each reactor contained three temperature controlled zones with 0.68 liter/zone volume. The temperature of the reactor zones were in order (degrees centigrade): 113, 123, 124, 131, 131, 126, 128, 132, 130. The product from the last reactor was sent to a devolatilizing extruder were unreacted monomer and toluene were removed and the product was extruded and pelletized. The pellets were found to contain 6.2% copolymerized acrylonitrile.

PROCEDURE C

Preparation of a Terpolymer Comprising Styrene, acrylonitrile, and Butadiene (used in Example 6)

A rubber modified terpolymer was prepared by thermally polymerizing a mixture of 75% styrene, 12.5% toluene, 3.5% acrylonitrile, 7.5% polybutadiene (Taktene 1202, Polysar Inc.), 1.4% mineral oil, and 0.07% Irganox 1076 (Ciba Geigy). The polymerization was carried out by pumping the feed mixture at a rate of 9.6 ml/min. to a reactor train consisting of 3 agitated reactors in series. Each reactor contained three temperature controlled zones with 0.68 liter/zone volume. The temperature of the reactor zones were in order (degrees centigrade): 118, 123, 128, 132, 138, 140, 146, 150, 167. The product from the last reactor was sent to a devolatilizing extruder where unreacted monomer and toluene were removed and the product was extruded and pelletized. The pellets were found to contain 4.6% copolymerized acrylonitrile.

PROCEDURE D

Preparation of a Terpolymer Comprising Styrene, acrylonitrile, and Butadiene (used in Example 8)

A rubber modified terpolymer was preapred by thermally polymerizing a mixture of 75% styrene, 12.5% toluene, 3.5% acrylonitrile; 7.5% polybutadiene (Taktene 1202, Polysar Inc.), 1.4% mineral oil, and 0.07% Irganox 1076 (Ciba Geigy). The polymerization was carried out by pumping the feed mixture at a rate of 13.2 ml/min. to a reactor train consisting of 3 agitated reactors in series. Each ractor contained three temperature controlled zones with 0.68 liter/zone volume. The temperature of the reactor zones were in order (degrees centrigrade): 111, 123, 128, 135, 140, 146, 136, 140, 158. The product from the last reactor was sent to a devolatilizing extruder where unreacted monomer and toluene were removed and the product was extruded and pelletized. The pellets were found to contain 5.9% copolymerized acrylonitrile.

PROCEDURE E

Preparation of a Terpolymer Used in Ex. 10 Comprising Styrene, acrylic acid and Butadiene A rubber modified terpolymer was prepared by thermally polymerizing a mixture of 77.7% styrene, 10% toluene, 3% acrylic acid, 7.5% polybutadiene (Taktene 1202, Polysar Inc.), 1.7% mineral oil, and 0.07% Irganox 1706 (Ciba Geigy). The polymerization was carried out by pumping the feed mixture at a rate of 10.6 ml/min. to a reactor train consisting of 3 agitated reactors in series. Each reactor contained three temperature controlled zones with 0.68 liter/zone volume. The temperature of the reactor zones were in order (degrees centrigrade): 100, 104, 105, 115, 123, 125, 123, 126, 125. The product from the last reactor was sent to a devolatilizing extruder where unreacted monomer and toluene were removed and the product was extruded and pelletized. The pellets were found to contain 4.3% copolymerized acrylic acid.

PROCEDURE F

Preparation of a Terpolymer Comprising Styrene, acrylic acid, and Butadiene (used in Example 3)

A rubber modified terpolymer was prepared by thermally polymerizing a mixture of 77.7% styrene, 10% toluene, 3% acrylic acid, 7.5% polybutadiene (Taktene 1202, Polysar Inc.), 1.7% mineral oil, and 0.07% Irganox 1076 (Ciba Geigy). The polymerization was carried out by pumping the feed mixture at a rate of 9.8 ml/min. to a reactor train consisting of 3 agitated reactors in series. Each reactor contained three temperature controlled zones with 0.68 liter/zone volume. The temperature of the reactor zones were in order (degrees centrigrade): 100, 103, 106, 127, 124, 125, 124, 132, 129. The product from the last reactor was sent to a devolatilizing extruder where unreacted monomer and toluene were removed and the product was extruded and pelletized. The pellets were found to contain 4.3% copolymerized acrylic acid.

PROCEDURE G

Preparation of a Terpolymer Comprising Styrene methacrylic acid, and Butadiene (used in Examples 4 and 11)

Two rubber modified terpolymers were prepared by thermally polymerizing a mixture of 77.7% styrene, 10% toluene, 3% methacrylic acid, 7.5% polybutadiene (Taktene 1202, Polysar Inc.), 1.7% mineral oil, and 0.07% Irganox 1076 (Ciba Geigy). The polymerization was carried out by pumping the feed mixture at a rate of 10 ml/min. to a reactor train consisting of 3 agitated reactors in series. Each reactor contained three temperature controlled zones with 0.68 liter/zone volume. The temperature of the reactor zones were in order (degrees centrigrade): 101, 104, 106, 127, 125, 124, 123, 132, 130. The product from the last reactor was sent to a devolatilizing extruder where unreacted monomer and toluene were removed and the product was extruded and pelletized. The pellets were found to contain 4.2% copolymerized methacrylic acid.

PROCEDURE H

Preparation of a Terpolymer Comprising Styrene, maleic anhydride, and polybutadiene (used in Examples 5 and 12)

Two rubber modified terpolymers were prepared by thermally polymerizing a mixture of 77.7% styrene, 10% toluene, 3% maleic anhydride, 7.5% polybutadiene (Taktene 1202, Polysar Inc.), 1.7% mineral oil, and 0.07% Irganox 1076 (Ciba Geigy). The polymerization was carried out by pumping the feed mixture at a rate of 9.4 ml/min. to a reactor train consisting of 3 agitated reactors in series. Each reactor contained three temperature controlled zones with 0.68 liter/zone volume. The temperature of the reactor zones were in order (degrees centrigrade): 88, 104, 108, 126, 124, 124, 123, 132, 130. The product from the last reactor was sent to a devolatilizing extruder where unreacted monomer and toluene were removed and the product was extruded and pelletized. The pellets were found to contain 5.0% copolymerized maleic anhydride.

PROCEDURE I

Preparation of the High Impact Polystyrene (used in Comparative Examples 1A*, 6A*)

A rubber modified polystyrene was prepared by thermally polymerizing a mixture of 78.5% styrene, 12.4% toluene, 7.5% polybutadiene (Taktene 1202, Polysar Inc.), 1.5% mineral oil, and 0.07% Irganox 1076 (Ciba Geigy). The polymerization was carried out by pumping the feed mixture at a rate of 10 ml/min. to a reactor train consisting of 3 agitated reactors in series. Each reactor contained three temperature controlled zones with 0.68 liter/zone volume. The temperature of the reactor zones were in order (degrees centigrade): 124, 130, 130, 139, 134, 142, 147, 147, 160, 165. The product from the last reactor was sent to a devolatilizing extruder where unreacted monomer and toluene were removed and the product was extruded and pelletized.

PROCEDURE J

Preparation of the High Impact Polystyrene (used in Comparative Examples 13B*, 14B*)

A rubber modified polystyrene was prepared by thermally polymerizing a mixture of 76.9% styrene, 13.7% toluene, 7.8% polybutadiene (Taktene 1202, Polysar Inc.), 1.6% mineral oil, and 0.07% Irganox 1076 (Ciba Geigy). The polymerization was carried out by pumping the feed mixture at a rate of 378 gm/min. to a reactor train consisting of 4 agitated reactors in series. The first three reactors contained three temperature controlled zones with 24 liter/zone volume and the last reactor contained one 24 liter zone. The temperature of the reactor zones were in order (degrees centigrade): 125, 130, 135, 139, 145, 155, 160, 165, 175, 180. The product from the last reactor was sent to flash tanks where where unreacted monomer and toluene were removed. The product was extruded and pelletized.

PROCEDURE K

Preparation of a Terpolymer Comprising Styrene, Acrylonitrile, and polybutadiene (used in Examples 13, 14 and 15)

A rubber modified polystyrene was prepared by thermally polymerizing a mixture of 74.7% styrene, 10.3% toluene, 5.0% acrylonitrile, 8.3% polybutadiene (Taktene 1202, Polysar Inc.), 1.6% mineral oil, and 0.07% Irganox 1076 (Ciba Geigy). The polymerization was carried out by pumping the feed mixture at a rate of 378 gm/min. to a reactor train consisting of 4 agitated reactors in series. The first three reactors contained three temperature controlled zones with 24 liter/zone volume and the last reactor contained one 24 liter zone. The temperature of the reactor zones were in order (degrees centigrade): 112, 118, 125, 125, 130, 135, 145, 155, 165, 175. The product from the last reactor was sent to flash tanks where unreacted monomer and toluene were removed. The product was then extruded and pelletilized and was found to contain 6.7% copolymerized acrylonitrile.

DESCRIPTION OF THE SPECIFIC EMBODIMENTS

The invention is further illustrated in the description below, which is set forth to show a preferred or best embodiment.

The compositions were prepared by forming a dry blend of the ingredients, compounding the blend by passage through a 28 mm Werner-Pfleiderer twin-screw extruder at about 570° F. melt temperature, and cooling and chopping the extrudate into pellets. The pellets were molded into 2.5 inch-thick miniature test pieces, using a 4-ounce Newbury injection molding machine, a 500° F. melt temperature, and a 170° F. mold temperature. The standard test bars were painted using the Lilly 1102D, the Eastern Chemlac T1450, the Raffi and Swanson 9660-30, the Sherwin Williams F63AC16 and the Red Spot 268-SL-20005 and 21282 paint systems.

The paint application protocols were as follows:

Red Spot 268SL21282 Ultrasuede Urethane (i) Reduced 100% with SV3765 solvent blend;
(ii) Air Atomization 35 PSI;
(iii) Force dry 15 minutes at 150° F.; and
(iv) Dry film thickness 0.8–1.0 mil.

Eastern Chemlac T1450 Two Component Polyurethane (i) Catalyzed with one part by volume with T1500;
(ii) Reduced 30% with T1470 solvent blend;
(iii) Air atomization 50 psi;
(iv) Force dry 30 min at 150° F.; and
(v) Dry film thickness 1.0–1.3 mils.

Lilly 1102D Urethane Enamel (i) Catalyzed eight pats to one part 666 catalyst;
(ii) Reduced 50% with 75516-1014 Solvent blend;
(iii) Air atomization 50 psi;
(iv) Force dry 20 minutes at 150° F.; and
(v) Dry film thickness 0.8–1.0 mils.

Raffi and Swanson 9660-30 Water Reducible Enamel (i) Reduced 10% with water;
(ii) Air atomization 50 psi;
(iii) Force dry 40 minutes at 150° F.; and
(iv) Dry film thickness 0.8–1.0 mil.

Testing for adhesion was in accordance with ANSI/ASTM D 3359-Method B. In certain instances, the painted samples were also submerged in water for 96 hours, and for 240 hours, or exposed to humidity, as specified. Paint adhesion is rated on a scale of "0" to "5". A rating of "0" indicates a complete loss of adhesion, and, therefore, eliminates the need for further evaluation, e.g., via water immersion.

EXAMPLES 1-5

Compositions comprising poly(2,6-dimethyl-1,4-phenylene ether) and rubber modified styrene-butadiene terpolymers were prepared, molded and tested. The compositions included triphenyl phosphate as a flame retardant. For comparison purposes, compositions were made using high impact polystyrenes, one prepared for this work (1A*), and another available commercially, American Hoechst FG 834 (5A*). The compositions used and the results obtained are set forth in Table 1:

TABLE 1

Paint Adhesion to Compositions Comprising Polyphenylene Ether Resins and Styrene-Polar Monomer-Diene Rubber Terpolymers

| | | EXAMPLE | | | | | | |
|---|---|---|---|---|---|---|---|---|
| | | 1A* | 1 | 2 | 3 | 4 | 5 | 5A* |
| Composition (parts by weight) | | | | | | | | |
| Poly(2,6-methyl-1,4-phenylene ether) | | 50 | 50 | 50 | 50 | 50 | 50 | 50 |
| Styrene-Co-Monomoer-Butadiene | | | | | | | | |
| Comonomer, % | | | | | | | | |
| none, 0 | | 50 | — | — | — | — | — | — |
| acrylonitrile, 5.1 | | — | 50 | — | — | — | — | — |
| acrylonitrile, 6.2 | | — | — | 50 | — | — | — | — |
| acrylic acid, 4.3 | | — | — | — | 50 | — | — | — |
| methacrylic acid, 4.2 | | — | — | — | — | 50 | — | — |
| maleic anhydride, 5 | | — | — | — | — | — | 50 | — |
| none, 0 | | — | — | — | — | — | — | 50 |
| Phosphate Flame Retardant | | 14.5 | 14.5 | 14.5 | 14.5 | 14.5 | 14.5 | 14.5 |
| Stabilizers and Mold Release | | 3.8 | 3.8 | 3.8 | 3.8 | 3.8 | 3.8 | 3.8 |
| Paint Adhesion | | | | | | | | |
| Lilly 11020 | initial | 5 | 5 | 5 | 5 | 5 | 5 | 5 |
| | 96 hr water soak | 5 | 5 | 5 | 5 | 5 | 5 | 5 |
| Eastern Chemlac | initial | 5 | 5 | 5 | 5 | 5 | 5 | 5 |
| T 1450 | 96 hr water soak | 5 | 5 | 5 | 5 | 5 | 5 | 5 |
| Red Spot | initial | 0 | 2 | 4 | 5 | 2 | 1 | 0 |

TABLE 1-continued

Paint Adhesion to Compositions Comprising Polyphenylene Ether Resins and Styrene-Polar Monomer-Diene Rubber Terpolymers

| | | EXAMPLE | | | | | |
|---|---|---|---|---|---|---|---|
| | | 1A* | 1 | 2 | 3 | 4 | 5 | 5A* |
| 268-SL-20005 | 96 hr water soak | 0 | 5 | 5 | 5 | .5 | 5 | 3 |

*Control, a KRONITEX ® K-50

As seen in Table 1, the initial adhesion results obtained from Examples 1–5 in accordance with the present invention showed significantly better results in the most discriminating Red Spot Paint System than control Examples 1A* and 5A*. Furthermore, the adhesion characteristics of Examples 1–5 were far superior to the control Examples after 96 hours of water submersion.

The test pieces were subjected to standard physical and thermal strength testing, including heat distortion temperature, tensile, flexural and flammability properties and exhibited values well within the range expected for commercially acceptable engineering thermoplastics.

EXAMPLES 6–12

Compositions were prepared as described for Examples 1–5, except that the formulations were adjusted and no flame retardant agent was included. The control high impact polystyrene used in example 12* was American Hoechst FG834. The compositions were molded and tested for paint adhesion. The formulations used and the results obtained are set forth in Table 2:

Experiments have also shown that flow channel values of Examples 5–9 (13.5 to 14 inches) employing the acrylonitrile-containing terpolymers used herein are superior to the Control Examples 6A* and 12A*(12.5 and 12.75 inches) using copolymers having no polar vinyl monomer. Accordingly, the incorporation of acrylonitrile in the styrene-butadiene polymer has the additional advantage of improving the flow properties of the polyphenylene ether containing compositions.

As was the case in Examples 1–5, the articles molded from the compositions of Examples 6–12 retained all other important properties, physical and thermal, possessed by the corresponding engineering thermoplastics.

EXAMPLES 13–14

Compositions were prepared as described in Examples 1–5, except that the formulations were adjusted, different flame retardant agents were included, and a 53 mm Werner and Pfleiderer extruder was used. In these examples, the terpolymer comprised styrene, 6.7% acrylonitrile and butadiene. Controls comprising no acry-

TABLE 2

Paint Adhesion to Compositions Comprising Polyphenylene Ether Resins and Styrene-Polar Monomer-Diene Rubber Terpolymers

| | | EXAMPLE | | | | | | | | |
|---|---|---|---|---|---|---|---|---|---|---|
| | | 6A* | 6 | 7 | 8 | 9 | 10 | 11 | 12 | 12A* |
| Composition (parts by weight) | | | | | | | | | | |
| Poly(2,6-methyl-1,4-phenylene ether) | | 40 | 40 | 40 | 40 | 40 | 40 | 40 | 40 | 40 |
| Styrene-Co-Monomoer-Butadiene | | | | | | | | | | |
| Comonomer, % | | | | | | | | | | |
| none, 0 | | 60 | — | — | — | — | — | — | — | — |
| acrylonitrile, 4.6 | | — | 60 | — | — | — | — | — | — | — |
| acrylonitrile, 5.1 | | — | — | 60 | — | — | — | — | — | — |
| acrylonitrile, 5.9 | | — | — | — | 60 | — | — | — | — | — |
| acrylonitrile, 6.2 | | — | — | — | — | 60 | — | — | — | — |
| acrylic acid, 4.3 | | — | — | — | — | — | 60 | — | — | — |
| methacrylic acid, 4.2 | | — | — | — | — | — | — | 60 | — | — |
| maleic anhydride, 5 | | — | — | — | — | — | — | — | 60 | — |
| none, 0 | | — | — | — | — | — | — | — | — | 60 |
| Stabilizers and Mold Release | | 4.5 | 4.5 | 4.5 | 4.5 | 4.5 | 4.5 | 4.5 | 4.5 | 4.5 |
| Paint Adhesion | | | | | | | | | | |
| Red Spot 268-SL | initial | 0 | 1 | 5 | 2 | 5 | 5 | 5 | 5 | 0 |
| 2005 | 96 hr water soak | 0 | 5 | 5 | 5 | 1 | 0 | 5 | 5 | 1 |
| Raffi & Swanson | initial | 0 | 5 | 5 | 5 | 5 | 5 | 5 | 5 | 2 |
| Durane 9660 | 96 hr water soak | 5 | 5 | 5 | 5 | 5 | 5 | 5 | 5 | 5 |

*Control

As seen in Table 2, the initial adhesion and adhesion after being submerged in water for 96 hours of the molded articles according to the present invention were overall clearly superior to the adhesion characteristics of molded articles prepared from compositions which contain HIPS having no polar vinyl monomers.

lonitrile were used, two made especially for this work, Examples 13B* and 14B* and two, 13A* and 14A*, using a commercial butadiene rubber modified polystyrene, American Hoechst's FG 840. The compositions were molded and tested for paint adhesion The formulations used and the results obtained are set forth in Table 3:

TABLE 3

Paint Adhesion to Compositions Comprising Polyphenylene Ether Resins and Styrene-Polar Monomer-Diene Rubber Terpolymers

| | EXAMPLE | | | | | |
|---|---|---|---|---|---|---|
| | 13A* | 13 | 13B* | 14A* | 14 | 14B* |
| Composition (parts by weight) | | | | | | |
| Poly(2,6-methyl-1,4-phenylene ether) | 50 | 50 | 50 | 55 | 55 | 55 |
| Styrene-Comonomer-Butadiene Comonomer, % | | | | | | |
| none, 0 | 50 | — | — | 45 | — | — |
| acrylonitrile, (Procedure K), 6.7 | — | 50 | — | — | 45 | — |
| none, 0 | — | — | 50 | — | — | 45 |
| Phosphate Flame retardant agent | 14.5 | 14.5 | 14.5 | 20 | 20 | 20 |
| Stabilizers and Mold Release | 3.8 | 3.8 | 3.8 | 4.8 | 4.8 | 4.8 |
| Paint Adhesion | | | | | | |
| Red Spot 268-SL-20837 | | | | | | |
| Ultrasuede Urethane | | | | | | |
| initial | 0 | 5 | 0 | 0 | 5 | 0 |
| after 20 hours of water immersion | — | 5 | — | — | 5 | — |

*Control

As clearly demonstrated in Table 3, only that addition of a terpolymer according to this invention provided satisfactory paint adhesion (rating of "5" at initial test and after a 10 day water immersion). The state-of-the-art formulations gave no adhesion at all.

Physical property and thermal resistance tests confirmed that all commercially important properties were fully retained with the compositions of the present invention.

EXAMPLE 15

Compositions were prepared as described in Examples 1-5, except that the formulations were adjusted and poly(dibromostyrene) was used as a flame retardant agent. In this Example, as in Examples 13 and 14, a terpolymer containing no acrylonitrile was also used, as were controls using phosphate stabilizers. The compositions were molded at a 523° F. melt temperature and a 150° F. mold temperature and tested for paint adhesion. The composition containing the terpolymer has a channel flow of 20.6 inches, which is much better than that of the control, 17.9 inches. The compositions used and the results obtained are set forth in Table 4:

TABLE 4

Paint Adhesion to Compositions Comprising Polyphenylene Ether Resins and Styrene-Polar Monomer-Diene Rubber Terpolymers

| | | EXAMPLE | | |
|---|---|---|---|---|
| | | 15A* | 15 | 15B* |
| Composition (parts by weight) | | | | |
| Poly(2,6-methyl-1,4-phenylene ether) | | 40 | 40 | 50 |
| Styrene-Comonomer-Butadiene Comonomer, % | | | | |
| none, 0 | | 60 | — | 50 |
| acrylonitrile, Procedure K, 6.7 | | — | 60 | — |
| Flame retardant agent, poly(dibromostyrene) | | 14+ | 14+ | — |
| organic phosphate | | — | — | 14.5 |
| Stabilizers, Mold Release, Pigments Plasticizers and Impact Modifiers | | 17.8 | 17.8 | 7.3 |
| Paint Adhesion | | | | |
| Red Spot 230WLE | initial | 5 | 5 | 5 |
| | 24 hrs, H₂O | 5 | 5 | 2 |
| | 240 hrs, H₂O | 5 | 5 | — |
| | 240 hrs, humid | 5 | 5 | — |
| Sherwin Williams | initial | 5 | 5 | 5 |
| F63AC16 | 24 hrs, H₂O | 5 | 5 | 5 |
| | 240 hrs, H₂O | 5 | 5 | 5 |
| | 240 hrs, humid | 5 | 5 | 5 |
| Reds Spot 268SL | initial | 0 | 5 | 0 |
| | 24 hrs, H₂O | — | 5 | — |
| | 240 hrs, H₂O | — | 5 | — |
| | 240 hrs, humid | — | 5 | — |
| Ultrasuede Urethane | | | | |
| | initial | 0 | 5 | 0 |
| | after 20 hours of water immersion | — | 5 | — |

The foregoing results show that only the Example containing the terpolymer in accordance with the present invention possessed satisfactory paint adhesion with the most differentiating paint system, namely, Red Spot 268 SL.

The foregoing examples and results clearly demonstrate that adding polyphenylene ether compositions are obtained in accordance with the present invention having improved paintability and adhesion and also utility in hot stamping by the use of polar vinyl monomers to synthesize styrene-diene rubber-comonomer(s) polymers.

The above-mentioned patents and publications, including test methods, are incorporated herein by reference.

Many variations in the present invention will suggest themselves to those skilled in this art in light of the above, detailed description. For example, instead of poly(2,6-dimethyl-1,4-phenylene ether), poly(2,6-dimethyl-co-2,3,6-trimethyl-1,4-phenylene ether can be used. The styrene can be replaced partially or entirely by vinyl toluene or dibromostyrene. The polybutadiene can be substituted by polyisoprene.

All such obvious variations are within the full intended scope of the appended claims.

We claim:

1. A method for the production of a decoratively-coated or a protectively-coated molded article, said method comprising:
   (i) adding an effective paint adhesion-promoting amount of a high impact rubber modified terpolymer resin comprising units of a non-polar aromatic monovinyl compound, a polar monovinyl compound and a diene rubber to a normally paint adhesion-resistant thermoplastic polyphenylene ether resin, alone, or in further combination with a styrene resin to obtain a moldable blended composition, wherein the amount of the polar vinyl monomer in said terpolymer is from about 1% to 8% by weight;
(ii) converting the moldable composition to a molded article; and
(iii) thereafter applying to said molded article a coating comprising a decorative paint or a protective paint having improved adhesion.

2. The method of claim 1, wherein the polar monovinyl compounds have at least one carbon-oxygen or carbon-nitrogen bond.

3. The method of claim 2, wherein the polar monovinyl compound is selected from acrylonitrile, acrylic acid, methacrylic acid, maleic anhydride, vinyl pyridine, methylmethacrylate, vinyl acetate, glycidyl methacrylate, alphahydroxyethyl methacrylate or a mixture of any of the foregoing.

4. The method of claim 1, wherein the diene rubber is polybutadiene.

5. The method of claim 1, wherein the non-polar aromatic monovinyl compound is styrene.

6. The method of claim 1 further comprising including in said moldable blended composition an effective flame retardant amount of a flame retardant agent.

7. The method of claim 1, wherein the composition is obtained by melt blending the terpolymer and the polyphenylene ether resin or combination of polyphenylene ether resin and styrene resin.

8. The method of claim 1, wherein the composition is obtained by forming a first solution containing the terpolymer and a second solution containing the polyphenylene ether resin and combining said first and second solutions to form a combined solution and desolventizing to convert the combined solutions to said composition.

9. The method of claim 1, wherein the amount of the polyphenylene ether resin in the composition is from about 80 to 20% by weight and the weight of the terpolymer is from about 20 to 80% by weight.

10. The method of claim 9, wherein the amount of the polyphenylene ether resin in the composition is from about 60 to 40% by weight and the weight of the terpolymer is from about 40 to 60% by weight.

11. The method of claim 1, in which the polyphenylene ether is a homopolymer or copolymer containing structural units of the formula:

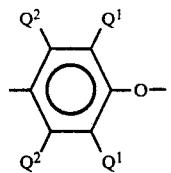

in which for each of these units independently each $Q^1$ is hydrogen, halogen, primary or secondary lower alkyl having up to seven carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

12. The method of claim 1, in which the polyphenylene ether is poly(2,6-dimethyl-1,4-phenylene ether).

13. The method of claim 12, in which the poly(2,6-dimethyl-1,4-phenylene ether) has an intrinsic viscosity of about 0.4 to 0.5 deciliters per gram in chloroform at 25° C.

14. The method of claim 1, in which the polyphenylene ether is poly(2,6-dimethyl-co-2,3,6-trimethyl-1,4-phenylene ether).

15. The method of claim 1, wherein the composition also includes high impact rubber modified polystyrene free of polar monovinyl compounds.

16. An article having a firmly adherent decorative coating or a firmly adherent protective coating produced by the method of claim 1.

17. An article as defined in claim 16, wherein the adhesion rating is at least 5 on the Method B-Cross-Cut Tape Test of ASTM Standard Test D 3359-76.

18. A method for the production of a decoratively-coated or a protectively-coated molded article, said method comprising:
(i) adding an effective paint adhesion-promoting amount of a single high impact rubber modified terpolymer resin comprising units of a non-polar aromatic monovinyl compound, a polar monovinyl compound and a diene rubber to a normally paint adhesion-resistant thermoplastic polyphenylene ether resin, alone, or in combination with a styrene resin to obtain a moldable blended composition;
(ii) converting the moldable composition to a molded article; and
(iii) thereafter applying to said molded article a coating comprising a decorative paint or a protective paint having improved adhesion.

19. The method of claim 18, wherein the polar monovinyl compounds have at least one carbon-oxygen or carbon-nitrogen bond.

20. The method of claim 19, wherein the polar monovinyl compound is selected from acrylonitrile, acrylic acid, methacrylic acid, maleic anhydride, vinyl pyridine, methyl-methacrylate, vinyl acetate, glycidyl methacrylate, alpha-hydroxyethyl methacrylate or a mixture of any of the foregoing.

* * * * *